United States Patent
Russmann et al.

(10) Patent No.: US 12,071,893 B2
(45) Date of Patent: Aug. 27, 2024

(54) TURBOMACHINE COMPRISING A SYSTEM FOR DEICING THE UPSTREAM CONE, AND ASSOCIATED METHOD

(71) Applicant: SAFRAN AIRCRAFT ENGINES, Paris (FR)

(72) Inventors: Jacques Russmann, Moissy-Cramayel (FR); Clément Dupays, Moissy-Cramayel (FR); Jean-Marc Blan, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 104 days.

(21) Appl. No.: 17/595,283

(22) PCT Filed: Apr. 21, 2020

(86) PCT No.: PCT/FR2020/050677
§ 371 (c)(1),
(2) Date: Nov. 12, 2021

(87) PCT Pub. No.: WO2020/229745
PCT Pub. Date: Nov. 19, 2020

(65) Prior Publication Data
US 2022/0235701 A1 Jul. 28, 2022

(30) Foreign Application Priority Data
May 13, 2019 (FR) .................................. 1904919

(51) Int. Cl.
*F02C 7/047* (2006.01)
*F01D 25/02* (2006.01)

(52) U.S. Cl.
CPC .............. *F02C 7/047* (2013.01); *F01D 25/02* (2013.01); *F05D 2220/323* (2013.01);
(Continued)

(58) Field of Classification Search
CPC .......... F02C 7/047; F01D 25/02; B64C 11/04; F05D 2220/323; F05D 2270/301; F05D 2270/303; F05D 2270/304
See application file for complete search history.

(56) References Cited

U.S. PATENT DOCUMENTS

| | | | |
|---|---|---|---|
| 2,699,303 A * | 1/1955 | Chilman | B64D 15/12 219/202 |
| 6,753,513 B2 * | 6/2004 | Goldberg | B64D 15/12 244/134 D |

(Continued)

FOREIGN PATENT DOCUMENTS

| | | |
|---|---|---|
| FR | 2941439 A1 | 7/2010 |
| WO | 2014143255 A1 | 9/2014 |

OTHER PUBLICATIONS

French Search Report issued in FR1904919 on Jan. 14, 2020 (6 pages).

(Continued)

*Primary Examiner* — Elton K Wong
(74) *Attorney, Agent, or Firm* — Bookoff McAndrews, PLLC

(57) ABSTRACT

A turbomachine comprising a cone positioned at an upstream end and secured in rotation to the low-pressure shaft, a system for deicing said cone, comprising resistive heating elements positioned in the cone, an energy transfer system, an electrical power source coupled to the high-pressure shaft and connected to the energy transfer system by a set of switches, and a computer configured so as to define a power set point for deicing the cone depending on ambient temperature and pressure data, and on an operating speed of the low-pressure shaft, and, depending on the electrical power supplied by the electrical power source, (Continued)

define a duty cycle of the set of switches to deliver electrical power to the resistive heating elements.

10 Claims, 2 Drawing Sheets

(52) U.S. Cl.
CPC .. *F05D 2270/301* (2013.01); *F05D 2270/303* (2013.01); *F05D 2270/304* (2013.01)

(56) References Cited

U.S. PATENT DOCUMENTS

| | | | |
|---|---|---|---|
| 8,522,522 B2 * | 9/2013 | Poisson | F02K 3/06 60/39.093 |
| 2010/0319358 A1 * | 12/2010 | Hogate | F02C 7/047 60/39.093 |
| 2015/0377129 A1 * | 12/2015 | Ward | F01D 25/02 60/39.093 |
| 2016/0353523 A1 | 12/2016 | Jarvinen | |
| 2018/0230853 A1 * | 8/2018 | Jastrzembowski | F02C 9/28 |

OTHER PUBLICATIONS

International Search Report issued in PCT/FR2020/050677 on Oct. 6, 2020 with English Translation (4 pages).

\* cited by examiner

[Fig. 1]
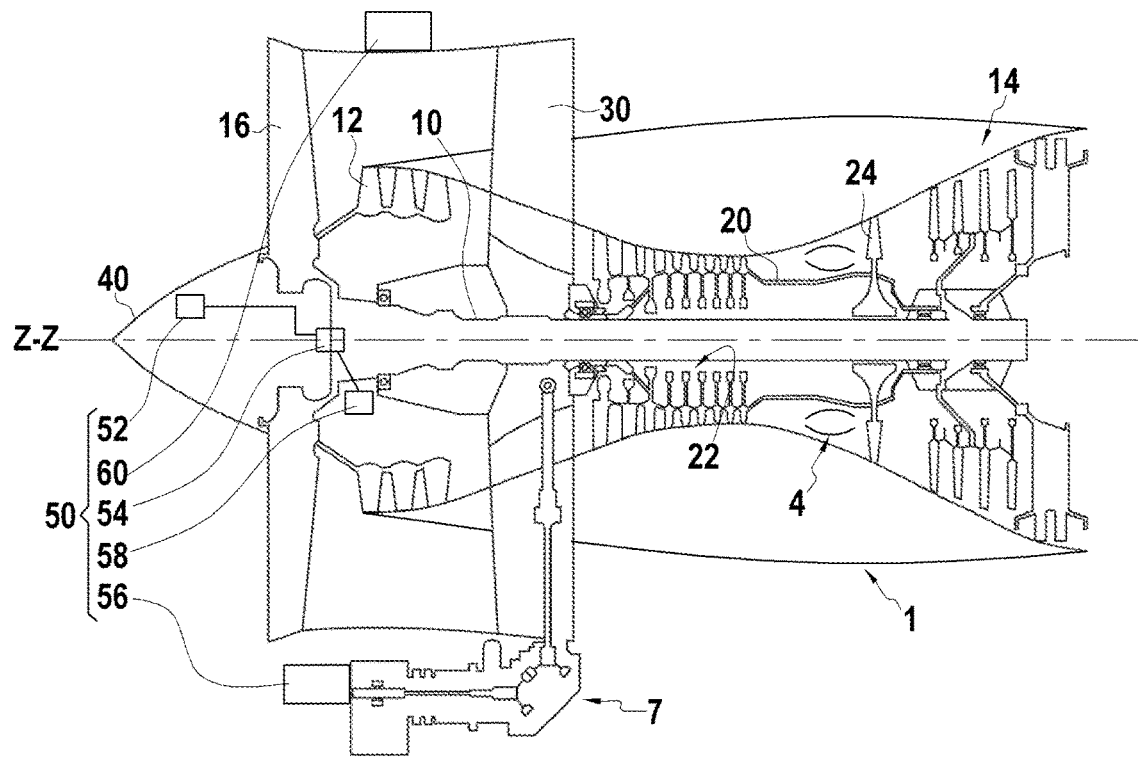
[Fig. 2]
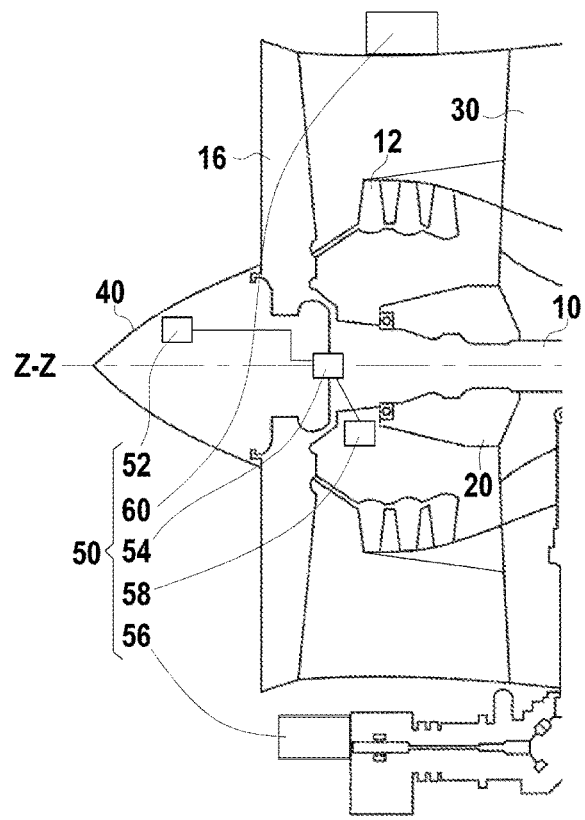

[Fig. 3]
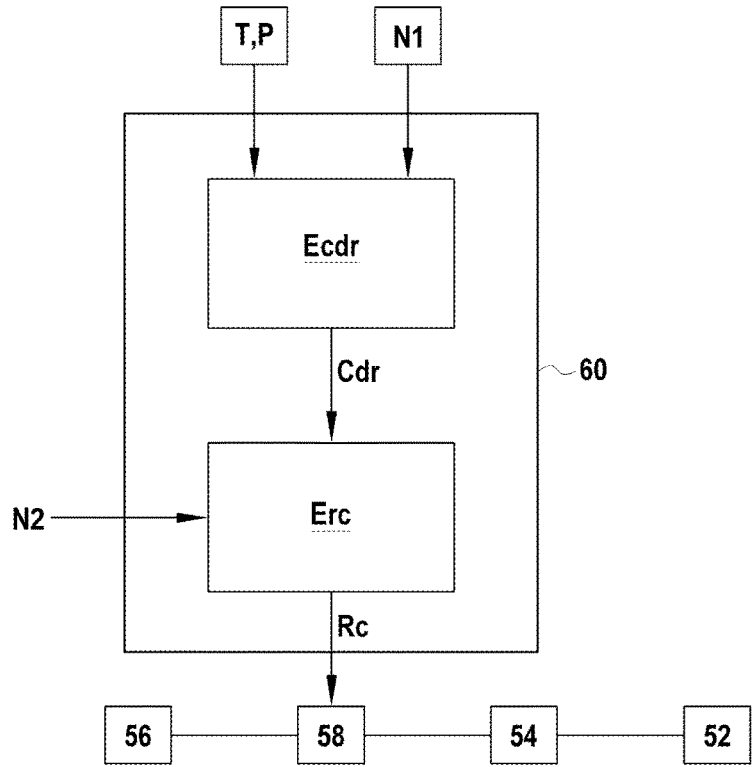
[Fig. 4]
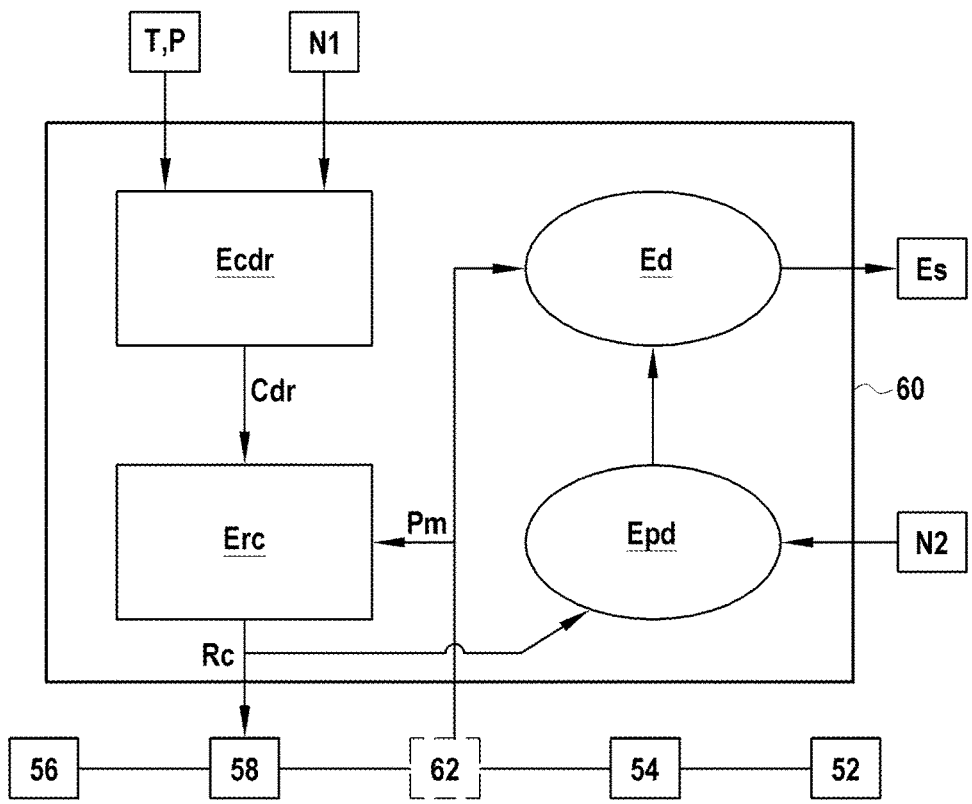

TURBOMACHINE COMPRISING A SYSTEM FOR DEICING THE UPSTREAM CONE, AND ASSOCIATED METHOD

CROSS-REFERENCE TO RELATED APPLICATIONS

This patent application is the U.S. National Stage entry under 35 U.S.C. § 371 of International Patent Application No. PCT/FR2020/050677, filed on Apr. 21, 2020, which claims the benefit of priority to French Patent Application No. 1904919, filed on May 13, 2019.

DOMAIN TECHNIQUE

The present disclosure relates to the field of turbomachines, and relates more precisely to a deicing system of a turbomachine cone, and the associated method.

PRIOR ART

Turbomachines employed on aircraft commonly have a cone positioned at the upstream end, at the air inlet into the turbomachine.

However, during flight under icing conditions, there is a risk of ice accumulating on this cone. Such an accumulation of ice poses a double problem. In fact, too great an accumulate of ice can undesirably modify the mass and the aerodynamic properties of the front cone. Moreover, in the event of a sudden release of a mass of ice accumulated on the cone, the ice thus released can be ingested by the turbomachine, which is likely to damage it.

One known solution consists of extracting a flow of hot air in the turbomachine, and creating a circulation of this flow of hot air in an internal cavity of the cone. It is however easily understood that such an extraction of hot air in the turbomachine will impact its efficiency, and cause an increase in the fuel consumption, which is very penalizing. Moreover, the transfer of a flow of air between components having a high relative rotation speed causes a problem for providing sealing between these components.

One alternative known solution consists of using an electrical anti-icing system including heating elements located on the internal wall of the cone of the turbomachine and supplied by an electrical power source. This alternative solution, however, has several problems. In the case of a rotating front cone, the need for dissipated heat power evolves depending on the speed at which air arrives on the cone, which is linked to the speed of the low-pressure shaft. This need evolves within a range bounded by a minimum value and a maximum value. In fact, the dissipated power must be sufficient to ensure a suitable anti-icing level of the front cone. However, the dissipated power must not lead to a temperature in excess of the maximum allowable by the materials of the front cone, to avoid loss of the mechanical characteristics of these materials. The mechanical power used by the anti-icing system is preferably extracted directly on the engine in order to ensure autonomy of the system with respect to the airplane electrical network. This electrical power is supplied by an electrical generator mechanically linked to a shaft of the turbojet, either by a direct outlet or through a gearbox. The prior art on a turbojet consists of extracting the energy from a single gearbox connected to a high-pressure shaft. Thus, the need for dissipated thermal power evolves depending on the speed of the low-pressure shaft of the turbojet, while the available electrical power evolves depending on the speed of the high-pressure shaft of the turbojet. However, the speeds of the low-pressure shaft and of the high-pressure shaft are distinct speeds that evolve independently depending on the flight phase, the environment, the wear of the turbojet and transient conditions.

One problem is therefore the feasibility of a control mode of the heating elements which allows ensuring both a suitable level of anti-icing of the front cone and the observance of the maximum allowable temperature of the materials of the cone regardless of the speed excursion of the high and low pressure shafts over all the operating points of the turbojet.

The present disclosure thus seeks to respond at least partially to these problems.

DISCLOSURE OF THE INVENTION

To this end, the present disclosure relates to a turbomachine comprising a stator, a high-pressure shaft, a low-pressure shaft, each movable in rotation with respect to the stator, and a cone positioned at an upstream end of the turbomachine in the direction of the air flow and secured in rotation to the low-pressure shaft, the turbomachine comprising a system for deicing said cone, comprising resistive heating elements positioned on an internal wall of said cone, an energy transfer system between said resistive heating elements and a stator of the turbomachine, the cone being movable in rotation with respect to the stator, an electrical power source coupled to the high-pressure shaft and connected to the energy transfer system by a set of switches, a computer, the computer being configured so as to define a power set point for deicing the cone depending on ambient temperature and pressure data, and on an operating speed of the low-pressure shaft, and so, depending on the electrical power supplied by the electrical power source, to define a duty cycle of the set of switches to deliver electrical power to the resistive heating elements.

According to one example, the computer is configured so as to determine the electrical power supplied by the electrical power source depending on an operating speed of the high-pressure shaft of the turbomachine.

According to one example, the turbomachine also comprises a power sensor positioned between the set of switches and the energy transfer system, adapted to supply information to the computer regarding the power delivered to the energy transfer system.

The turbomachine then typically comprises an estimator, configured, depending on the operating speed of the high-pressure shaft and on the duty cycle determined by the computer, to determine a theoretical power dissipated by the resistive heating elements, and a diagnostic unit, configured to compare the theoretical dissipated power determined by the computer and the power delivered to the energy transfer system measured by the power sensor, and, if the deviation between the theoretical dissipated power determined by the computer and the power delivered to the energy transfer system measured by the power sensor is greater than or equal to a threshold value, to deliver an error signal to a user.

According to one example, the energy transfer system is a rotating transformer, comprising a movable assembly secured in rotation to the cone, and a fixed assembly secured to the stator.

According to one example, the one electrical power source is a permanent-magnet alternator coupled to the high-pressure shaft.

The present disclosure also relates to an aircraft comprising a turbomachine as previously defined.

The present disclosure also relates to a method for deicing an upstream cone of a turbomachine, in which a required deicing power set point is defined depending on the ambient temperature and pressure conditions of the cone and a rotation speed of the cone (which corresponds to the speed of a low-pressure shaft of the turbomachine, the cone being secured to the low-pressure shaft), a duty cycle of a set of switches is defined depending on the electrical power supplied by an electrical power source coupled to a high-pressure shaft of the turbomachine, said set of switches is controlled by means of the duty cycle so as to deliver electrical power to resistive heating elements positioned in the cone via an energy transfer system between said resistive heating elements and a stator of the turbomachine.

According to one example, the electrical power supplied by the electrical power source is determined depending on the rotation speed of the high-pressure shaft of the turbomachine.

According to one example, the electrical power supplied by the electrical power source is determined by means of a power sensor supplying information regarding the power delivered to the energy transfer system.

BRIEF DESCRIPTION OF THE DRAWINGS

The invention and its advantages will be better understood upon reading the detailed description made hereafter of different embodiments of the invention given by way of non-limiting examples. This description refers to the appended pages of figures, in which:

FIG. 1 shows a schematic view of a turbomachine according to one aspect of the invention.

FIG. 2 is a detailed view of the upstream region of the turbomachine of FIG. 1.

FIG. 3 is a schematic view of the operation of a system according to one aspect of the invention.

FIG. 4 is a schematic view of the operation of a system according to one variant of the invention.

In all the figures, common elements are labeled with identical numerical references.

DESCRIPTION OF THE EMBODIMENTS

FIGS. 1 and 2 show schematically a turbomachine according to one aspect of the invention. Shown in these figures is a portion of the turbomachine 1 in a section view. The turbomachine 1 as shown comprises a low-pressure shaft 10 extending along a main axis Z-Z defining a longitudinal direction of the turbomachine and connecting a low-pressure compressor 12 to a low-pressure turbine 14, a high-pressure shaft 20 extending in the longitudinal direction and [connecting] a high-pressure compressor 22 to a high-pressure turbine 24, a combustion chamber 4 positioned between the high-pressure compressor 22 and the high-pressure turbine 24.

The low-pressure shaft 10 is linked to the fan 16, and has a cone 40 positioned at its upstream end in the direction of the air flow. As indicated in the preamble, the present disclosure seeks to propose a system and a method for the prevention of ice formation on this cone 40.

The turbomachine also comprises an accessory gearbox 7, which is shown schematically here. It is noted that the position of the accessory gearbox 7 can also vary, and is arbitrary in FIG. 1. The operation of these different components is well known, and will not be described in more detail here. It is noted moreover that the denominations "high pressure" and "low pressure" for the components of a turbomachine are commonly recognized by a person skilled in the art, and do not designate absolute pressure values, but rather relative pressure values, the pressure of the fluid within a low-pressure component being less than the pressure of the fluid within a similar high-pressure component.

The low-pressure shaft 10 and the high-pressure shaft 20 are mounted in rotation along the main axis Z-Z with respect to a casing 30, which generally designates the elements defining the outer envelope of the turbomachine 1 and via which the turbomachine 1 is secured to an aircraft, the casing 30 thus being fixed with respect to the aircraft, unlike the high-pressure shaft 20 and the low-pressure shaft 10 which are mounted in rotation along the main axis Z-Z. By fixed, what is meant here are elements fixed in the stator sense, elements qualified as fixed also being subjected to forces and stresses causing deformation.

The turbomachine 1 as shown is provided with a system 50 for deicing its cone 40, which is shown schematically in the figures.

The deicing system 50 as shown comprises resistive heating elements 52 positioned in the cone 40, an energy transfer system 54 between the resistive heating elements 52 and a stator of the turbomachine 1, an electrical power source 56 coupled to the high-pressure shaft 20 and connected to the energy transfer system 54 by a set of switches 58, and a computer 60.

The resistive heating elements 52 are typically resistive heating pads positioned on an internal wall of the cone 40, so as to allow heating of the cone 40 when the resistive heating elements 52 are activated and supplied with energy.

The electrical power source 56 is typically a permanent magnet alternator coupled to the high-pressure shaft 20. The electrical power source 56 is configured so as to deliver electrical power depending on the rotation speed of the high-pressure shaft 20.

The electrical power source 56 connected to the resistive heating elements 52 by means of the energy transfer system 54. The energy transfer system 54 provides energy transfer between a fixed assembly (or stator) of the turbomachine 1, and the resistive heating elements 52 which are positioned in the rotating cone 40 of the turbomachine 1. The energy transfer system 54 typically comprises a rotating transformer having a fixed assembly (or stator) secured to the stator of the turbomachine 1, and a movable assembly (or rotor) secured in rotation to the cone 40. By way of an example, the stator of the energy transfer system 54 can be fixed to a bearing support positioned in a compressor cavity of the turbomachine 1.

The set of switches 58 is interposed between the electrical power source 56 and the energy transfer system 54. This set of switches 58 is configured so as to control the power transmitted to the energy transfer system 54, and therefore the power transmitted to the resistive heating elements 52.

The computer 60 controls the power supplied to the resistive heating elements 52 by controlling the duty cycle of the set of switches 58. More generally, the computer 60 determines the deicing power required in order to supply the resistive heating elements 52, and defines a duty cycle of the set of switches 58 in order to supply power adapted to the resistive heating elements 52.

The determination of the required deicing power is accomplished by the computer 60 depending on the ambient temperature T and pressure P conditions, as well as depending on the speed of the low-pressure shaft 10, designated N1. In fact, for a rotating upstream cone 40, the need for power to accomplish deicing of the cone 40 depends on ambient conditions and also on the speed of flow of the air on the cone, which is linked to the rotation speed of the fan 16, and therefore to the rotation speed N1 of the low-pressure shaft 10.

The computer 60 then determines the duty cycle of the set of switches 58 in order to supply power adapted to the resistive heating elements 52. As indicated previously, the electrical power source 56 is coupled to the high-pressure shaft 20; the electrical power generated therefore depends direction on the rotation speed of the high-pressure shaft 20, designated N2. However, the rotation speed of the high-pressure shaft 20 is not correlated with the rotation speed of the low-pressure shaft 10. The computer 60 is thus configured, depending on the electrical power supplied by the electrical power source 56 and on the required deicing power, so as to define a duty cycle of the set of switches 58 to deliver electrical power to the resistive heating elements 52.

The computer 60 can thus determine the electrical power supplied by the electrical power source 56 depending on the rotation speed N2 of the high-pressure shaft 20 of the turbomachine 1. Operation of this type is shown schematically in FIG. 3.

FIG. 3 thus shows schematically:
T: ambient temperature value (or outside temperature around the cone 40).
P: ambient pressure value (or outside pressure around the cone 40).
N1: speed of the low-pressure shaft.
N2: speed of the high-pressure shaft.
Ecdr: calculation of the required deicing power.
Cdr: deicing power set point.
Erc: calculation of the duty cycle.
Rc: the duty cycle.

The computer 60 can thus adapt the duty cycle of the set of switches 58 depending on the power delivered by the electrical power source 56, which allows avoiding a situation in which the electrical power supplied to the resistive heating elements 52 would be too great due to too high a rotation speed N2 of the high-pressure shaft 20. More precisely, modeling the system allows defining a law linking the deicing power and the speed of the high-pressure shaft, thus allowing defining a duty cycle for the different phases of flight. The law thus established takes tolerances and variations into account, particularly for the electrical power source 56 and the different electrical components, as well as for the resistive heating elements 52.

This embodiment thus allows ensuring matching between the available electrical power and the required deicing power for the different modes of operation of the turbomachine, while avoiding the addition of additional sensors, particularly those mounted on rotating elements.

As a variant, the system comprises a power sensor 62 positioned upstream of the energy transfer system 54, between the set of switches 58 and the energy transfer system 54. This power sensor 62 thus measures the power delivered to the input of the energy transfer system 54. The information thus measured is supplied to the computer 60 for calculating the duty cycle, instead of using the operating speed N2 of the high-pressure shaft 20. This variant is shown schematically in FIG. 4. This variant allows dispensing with the variations of the characteristics of the different components upstream of the energy transfer system 54 for the determination of the duty cycle, and therefore allow improving the accuracy of the system.

The system can also accomplish an estimation and diagnostic function, these functions being able to be accomplished by the computer 60 or by dedicated components.

These optional functions are shown schematically in FIG. 4, which are shown here as being accomplished by the computer 60.

The computer 60 then determines, depending on the determined duty cycle and on the speed of the high-pressure shaft 20, a theoretical deicing power, i.e. an estimate of the deicing power supplied to the resistive heating elements 52 depending on the characteristics of the system. The theoretical deicing power thus calculated is then compared with the power measured by the power sensor 62, in order to accomplish a system diagnostic. If the gap between the theoretical deicing power and the measured power is greater than a threshold value, then an error signal is transmitted in order to indicate a malfunction to a user.

FIG. 4 thus shows schematically:
T: ambient temperature value.
P: ambient pressure value.
N1: speed of the low-pressure shaft.
N2: speed of the high-pressure shaft.
Ecdr: calculation of the required deicing power.
Cdr: deicing power set point.
Erc: calculation of the duty cycle.
Rc: the duty cycle.
Pm: measured power.
Epd: estimation of the deicing power.
Ed: accomplishment of a diagnostic.
Es: error signal.

This variant thus allows improving the performance in terms of accuracy of the deicing, while limiting the impact in loss of reliability of the system linked to the introduction of sensors in a rotating frame of reference by means of a diagnostic method thus allowing detecting and taking into account possible breakdowns.

The invention claimed is:

1. A turbomachine comprising a stator, a high-pressure shaft, a low-pressure shaft, and a cone positioned at an upstream end of the turbomachine in a direction of an air flow and secured in rotation to the low-pressure shaft, wherein the high-pressure shaft and the low-pressure shaft are each movable in rotation with respect to the stator, the turbomachine comprising a system for deicing said cone, comprising:
resistive heating elements positioned on an internal wall of said cone,
an energy transfer system between said resistive heating elements and the stator of the turbomachine, the cone being movable in rotation with respect to the stator of the turbomachine,
an electrical power source coupled to the high-pressure shaft and connected to the energy transfer system by a set of switches,
a computer,
the computer being configured so as to:
receive ambient temperature and pressure data, and an operating speed value of the low-pressure shaft,
determine a value of electrical power supplied by the electrical power source,
define a power set point for deicing the cone,
define a duty cycle of the set of switches to deliver electrical power to the resistive heating elements based on the power set point for deicing the cone and the value of electrical power supplied by the electrical power source.

2. The turbomachine according to claim 1, wherein the computer is configured so as to determine the electrical power supplied by the electrical power source depending on an operating speed of the high-pressure shaft of the turbomachine.

3. The turbomachine according to claim 1, also comprising a power sensor positioned between the set of switches and the energy transfer system, adapted to supply information to the computer regarding the power delivered to the energy transfer system.

4. The turbomachine according to claim 3, also comprising an estimator, configured, depending on the operating speed of the high-pressure shaft and on the duty cycle determined by the computer, to determine a theoretical power dissipated by the resistive heating elements, and a diagnostic unit, configured to compare the theoretical dissipated power determined by the computer and the power delivered to the energy transfer system measured by the power sensor, and, if a deviation between the theoretical dissipated power determined by the computer and the power delivered to the energy transfer system measured by the power sensor is greater than or equal to a threshold value, to deliver an error signal to a user.

5. The turbomachine according to claim 1, wherein the energy transfer system is a rotating transformer, comprising a movable assembly secured in rotation to the cone, and a fixed assembly secured to the stator.

6. The turbomachine according to claim 1, wherein the one electrical power source is a permanent-magnet alternator coupled to the high-pressure shaft.

7. An aircraft comprising a turbomachine according to claim 1.

8. A method for deicing an upstream cone of a turbomachine, comprising:
   receiving ambient temperature and pressure data, and an operating speed of a low-pressure shaft of the turbomachine, and
   determining a value of electrical power supplied by an electrical power source, wherein:
   a. a required deicing power set point is defined, the cone being secured to a low-pressure shaft,
   b. a duty cycle of a set of switches is defined based on the required deicing power set point and the value of the electrical power supplied by the electrical power source coupled to a high-pressure shaft of the turbomachine, and
   c. said set of switches is controlled by means of the duty cycle so as to deliver electrical power to resistive heating elements positioned in the cone via an energy transfer system between said resistive heating elements and a stator of the turbomachine.

9. The method according to claim 8, wherein the electrical power supplied by the electrical power source is determined depending on a rotation speed of the high-pressure shaft of the turbomachine.

10. The method according to claim 8, wherein the electrical power supplied by the electrical power source is determined by means of a power sensor supplying information regarding the power delivered to the energy transfer system.

* * * * *